United States Patent Office 3,440,282
Patented Apr. 22, 1969

---

3,440,282
DICHLORO-POLYNITRO-AZAALKANES
Milton B. Frankel, Menlo Park, Marvin H. Gold, Sacramento, and Henry J. Marcus, West Covina, Calif., assignors to Aerojet-General Corporation, Azusa, Calif., a corporation of California
No Drawing. Filed July 30, 1964, Ser. No. 386,379
Int. Cl. C07c 79/12, 79/46
U.S. Cl. 260—583     3 Claims

---

ABSTRACT OF THE DISCLOSURE

A class of compounds having the formula:

$$R\left(-\underset{\underset{NO_2}{|}}{\overset{\overset{Cl}{|}}{C}}-\right)_n R'$$

wherein $n$ is an integer of from 1 to 2, R is a lower alkyl radical, and R' is an organic radical having a valence numerically equal to $n$, and when $n=1$ has the formula:

$$-CH_2-O-\overset{\overset{O}{\|}}{C}-R''$$

wherein R'' is a monovalent lower nitroaryl radical; and when $n=2$, is a divalent organic radical selected from the group consisting of $$-CH_2-O-\overset{\overset{O}{\|}}{C}-A'-\overset{\overset{O}{\|}}{C}-O-CH_2-$$

wherein A' is a lower nitroalkylene radical, a

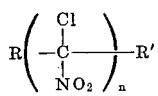

radical, a

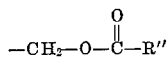

radical, a

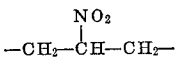

radical, and a

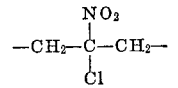

radical. This patent in addition describes methods for the preparation of these compounds which are useful as oxidizers.

---

This invention pertains to a novel class of compounds containing one or more terminal

(R=lower alkyl) groups, and to their method of synthesis.

It is an object of this invention to prepare a novel class of chemical compounds. It is another object of this invention to provide a valuable new group of oxidizing agents. A further object of our invention is the provision of processes for the preparation of chemical compounds having at least one terminal

group. These and other objects of this invention will be apparent from the detailed description which follows:

The novel class of chemical compounds of this invention have the following generic formula:

(I)   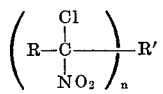

wherein $n$ is an interger equal to 1 or 2, R is a lower alkyl radical, usually having from 1 to about 6 carbons, i.e., methyl, ethyl, isopropyl, tertiary butyl, hexyl, etc.; and R' is an organic radical having a valence numerically equal to "$n$"; and when $n=1$, has the formula $$-CH_2-O-\overset{\overset{O}{\|}}{C}-R''$$

wherein R'' is a monovalent nitroaryl radical; and when $n=2$ is a divalent organic radical selected from the group consisting of $$-CH_2-O-\overset{\overset{O}{\|}}{C}-A'-\overset{\overset{O}{\|}}{C}-O-CH_2-$$

wherein A' is a nitroalkylene radical, a

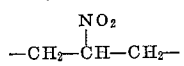

radical, a

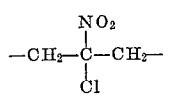

radical, a

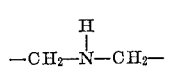

radical and a

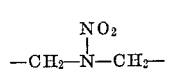

radical. In the foregoing formula, the R'' and A' radicals are preferably the lower members of the series and contain from 1 to about 8 carbon atoms. Typical R'' groups include 2-nitrophenyl, 3,5-dinitrophenyl, 2,4,6-trinitrophenyl, and 4-nitrotolyl. Illustrative A' groups are those having the formula:

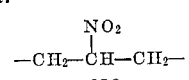

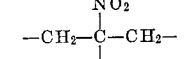

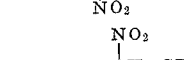

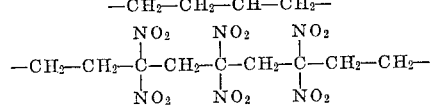

and

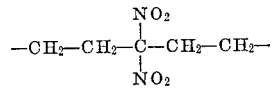

In Formula I, when R' is

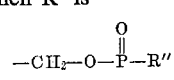

the compounds are prepared in accordance with the following general reaction equation:

(II)
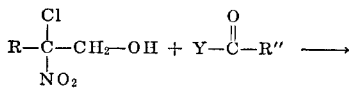
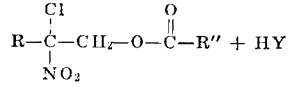

wherein R and R" are as previously defined, and Y is hydrogen or halogen, preferably chlorine or bromine.

When R' in Formula I is

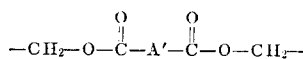

the process of preparation is as follows:

(III)
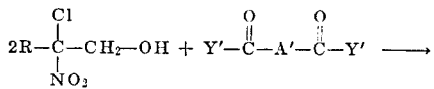
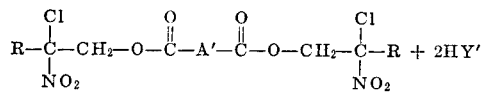

wherein A' is nitroalkylene and Y' is hydrogen or halogen, such as chlorine or bromine.

Reactions II and III are preferably, although not necessarily, conducted in the presence of a reaction solvent. The best solvent to be used depends upon the specific reactants involved. For example, if the acid reactant is used in the form of the halide, the reaction is preferably conducted in a basic solvent which serves to take up the hydrogen halide as it is evolved, thus maintaining the driving force necessary to complete the reaction. If the acid per se is used, the reaction is best carried out in an organic solvent which is immiscible with water. In this way, the by-product water formed is continuously removed from the system. Suitable organic solvents include benzene, toluene, xylene, chloroform, hexane, pentane and butane.

In general, the acid reactant and the 2-chloro-2-nitroalkanol-1 are employed in about stoichiometric amounts. In this way, there is no substantial loss of valuable reactants. However, proportions are not critical, and the desired esters are obtainable using a wide range of acid/alcohol ratios.

These esterification reactions are normally conducted at a temperature of from about 40° C. to about 175° C. and at a pressure of from about 0.1 to about 20 atmospheres. In general, the reaction temperature is maintained at a sufficiently high level to provide a high reaction rate without decomposing the reactants or the ester products.

The 2-chloro-2-nitroalkanol-1 reactants are prepared by reaction of a 1-chloro-1-nitroalkane with formaldehyde in the presence of a base such as sodium hydroxide. These compounds may also be prepared in the presence of potassium bicarbonate as is described in Chemisches Zentralblatt, 1897, II, 338.

Some illustrative reactants and esters involved in Reactions II and III are set forth in Table I.

When R' in Formula I is

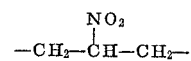

the preparation is as follows:

(IV)
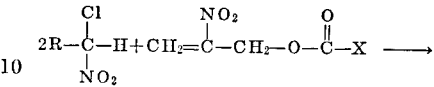
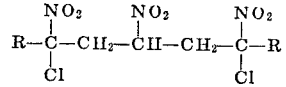

wherein X is a monovalent organic radical, such as, lower alkyl or lower aryl of 1 to about 8 carbons, or heterocyclic.

Reaction IV involves the reaction of a 1-chloro-1-nitroalkane, or alkali or alkaline earth metal salt thereof, with an ester of 2-nitroallyl alcohol. It is to be understood that in place of the ester of 2-nitroallyl alcohol, a diester of 2-nitro-1,3-propanediol can be used, as for example, 2-nitro-1,3-diacetoxypropane. The diester generates the 2-nitroallyl alcohol in situ and then reacts in the manner illustrated in Reaction IV.

As noted, the 1-chloro-1-nitroalkane reactant can be used as such, or in the form of the alkali or alkaline earth metal salt. The salts may be prepared by reacting the free alkane with a stoichiometric amount of an alkali or alkaline earth metal hydroxide, such as, sodium hydroxide, potassium hydroxide or calcium hydroxide. Optionally, the salts may be generated in situ by the addition of the hydroxide to the 1-chloro-1-nitroalkane-2-nitroallyl alcohol reaction mixture.

Since the acid portion of the nitroallyl ester does not enter into or affect the reaction, X can be any organic radical including phenyl, benzyl, heterocyclic, cycloaliphatic, or the like, without departing from the scope of this invention. Similarly, when a diester of 2-nitro-1,3-propanediol is used as the starting material, the acid portion can be any organic acid inasmuch as this portion of the diester does not affect the reaction in any way.

The reaction temperature used in Reaction IV is not critical and can be varied as desired. It will be appreciated, however, that at higher temperatures the reaction is more difficult to control, while at lower temperatures the rate is considerably slower. Ordinarily, the reaction temperature is within the range from about −20° C. to about 100° C.

The 2-nitroallyl ester reactant is prepared by the method disclosed in assignee's copending patent application Serial No. 445,885, filed July 26, 1954, now abandoned. The diesters of 2-nitro-1,3-propanediol are obtained by esterifying, for example, 2-nitro-1,3-propanediol with acetic acid, acetic anhydride or acetyl chloride. The 1-chloro-1-nitroalkanes are prepared by reaction of a salt of a 1-nitroalkane with chlorine as is more fully described in assignee's copending application Serial No. 127,895, filed July 31, 1961.

The amounts of the 1-chloro-1-nitro alkane and ester of 2-nitroallyl alcohol used are not limited to any specific ratio. For the sake of economy in the utilization of reactants, about stoichiometric amounts are employed.

The reaction is preferably conducted in the presence of

TABLE I

| Alcohol | Acid Reactant | Ester |
| --- | --- | --- |
| 2-chloro-2-nitropropanol-1 | 3,5-dinitrobenzoic acid | 2-chloro-2-nitro-n-propyl 3,5-dinitrobenzoate. |
| 2-chloro-2-nitrobutanol-1 | p-Nitrobenzoyl chloride | 2-chloro-2-nitro-n-butyl p-nitrobenzoate. |
| 2-chloro-2-nitropentanol-1 | p-Nitrobenzoyl bromide | 2-chloro-2-nitro-n-pentyl p-nitro-benzoate. |
| 2-chloro-2-nitrohexanol-1 | 4-nitro-1,7-heptanedioic acid | Bis-(2-chloro-2-nitro-n-hexyl) 4-nitro-1,7-heptanedioate. |
| 2-chloro-2-nitro-4-methylpentanol-1 | 6,6-dinitro-1,11-undecanedioyl chloride | Bis-(2-chloro-2-nitro-4-methyl-pentyl) 6,6-dinitro-1,11-undecanedioate. | a polar solvent such as water, methanol, ethanol, and mixtures thereof.

When R' is

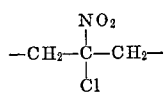

the reaction is:

(V)

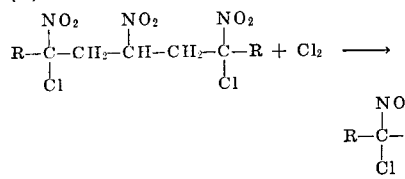

Chlorination Reaction V is carried out at a temperature of from −20° C. to about +75° C., preferably from −10° C. to +20° C., in polar solvent such as water or the lower alkanols, and preferably in the presence of a small amount of base (NaOH, KOH, LiOH, Ca(OH)$_2$, etc.) to maintain the pH above 7 and, most preferably, within the range from about 7 to about 11. The chlorination requires a stoichiometric amount or an excess of chlorine. The chlorination may be accomplished at any pressure, but atmospheric pressure up to about 50 atmospheres is preferred.

Where R' is

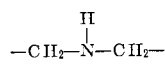

the reaction is:

(VI)

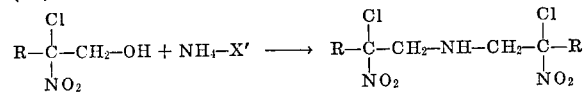

wherein X' is the anion of a weak acid. Typical of such anions are acetate, propionate, butyrate, isovalerate, valerate, benzoate, α-naphthoate, β-naphthoate nitrite and nicotinate. Thus the ammonium salt of any weak acid containing one of these anions may be reacted with the 2-chloro-2-nitroalkanol-1, according to this novel reaction. In general, the ammonium salts of the lower alkanoates are preferred. The ammonium alkanoates having the formula $$NH_4\text{—}O\text{—}\overset{O}{\underset{\|}{C}}\text{—}R'''$$

wherein R''' is a lower alkyl group of from 1 to about 6 carbons, are preferred.

While not essential, this reaction is conveniently carried out in a polar solvent such as water, methanol, or any other material in which the reactants are at least somewhat soluble. The reaction takes place at a most suitable rate when the temperature is maintained between about 20° C. and 150° C., and more particularly, at a temperature between 75° C. and 100° C. Best yields of the desired aza compounds result when the two reactants are provided in about stoichiometric amounts.

Where R' is:

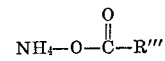

the reaction is:

(VII)

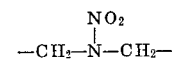

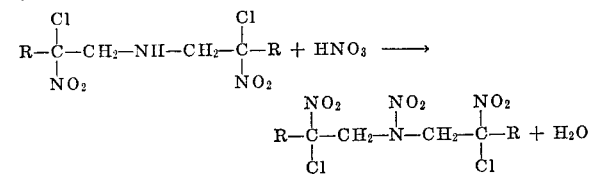

Nitration Reaction VII may be accomplished in any one of several ways. Thus, by one technique, the desired nitraza

compounds can be obtained directly by reacting the corresponding aza compound with concentrated nitric acid (91 to 99.5 percent by weight) in the presence of acetic anhydride. This reaction is carried out at a temperature of from about −20° C. to about +20° C. For best yields the mole ratio of aza compound/HNO$_3$/acetic anhydride is from about 1.0/0.75/0.75 to about 1.0/50/50. In those cases where a large amount of nitric acid is used, the acid also serves as a reaction solvent.

Alternatively, the nitraza compounds can be obtained using less concentrated nitric acid (90 percent to 60 percent by weight). By this reaction, the initial product of nitration formed is a nitrate salt of the formula:

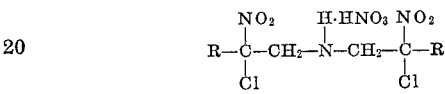

This salt formation step is usually carried out at a temperature of from about −20° C. to about +20° C. In this reaction, an inert solvent such as diethyl ether or trifluoroacetic acid may be used.

The nitric acid salt thus obtained is converted to the nitraza compound by dehydration at a temperature of from about +20° C. to +50° C. in the presence of a mixture comprising acetic anhydride, concentrated hydrochloric acid (35 to 38 percent by weight) and concentrated nitric acid (91 to 99.5 percent by weight). In the dehydration step, best results are obtained when the salt and the acetic anhydride are used in equimolar amounts; and from about 0.01 to about 0.1 moles of hydrochloric acid and from about 0.05 to about 0.20 moles of concentrated nitric acid are used per mole of salt.

For this dehydration step, normally no solvent is necessary. However, if desired, any substantially inert solvent may be used to facilitate agitation, and thus increase the reaction rate.

The following examples are presented solely to illustrate the invention and should not be construed as limiting it to the specific details and procedures set forth in the examples. The parts and percentages are by weight unless otherwise indicated.

Examples I through IV illustrate Reaction II.

Example I.—Preparation of 2-chloro-2-nitro-n-propyl 3,5-dinitrobenzoate

To a flask fitted with stirrer, thermometer, and dropping funnel were added 80 ml. water and 14 grams (50 percent by weight) aqueous sodium hydroxide. At 0° C. was added 42.5 grams (0.3 M) 1-chloro-1-nitroethane (assumed to be about 80 percent pure). An additional 4 grams of 50 percent sodium hydroxide were added. While keeping the reaction mixture at +3 to −3° C., 25 ml. of 37 percent aqueous formaldehyde were added over 15 minutes. The oily mixture was then stirred an additional hour at 0° C. The mixture was acidified to litmus by the dropwise addition of glacial acetic acid. The oil was separated from the aqueous phase, and the aqueous phase extracted twice with methylene chloride. The methylene chloride extracts were combined with the oil and dried over sodium sulfate. The solvent was removed and the residue distilled under vacuum. The product distilled at 64 to 78° C. at 4 mm. It solidified readily in the receiver to form a colorless crystalline mass. The 2-chloro-2-nitropropanol-1 product was extremely hydroscopic. 2-chloro-2-nitropropanol-1 (40.5 grams, 0.29 M) was dissolved in pyridine (250 ml.). To the deep yellow solution was added 74 grams (0.32 M) 3,5-dinitrobenzoyl chloride. The mixture darkened and became hot. It was left standing for 10 minutes, slowly heated to reflux, and refluxed for 30 minutes. The mixture was poured on ice and water, and the light tan crystals filtered. The crude product was washed well with water, slurried for 10 minutes with one liter of 2 percent sodium carbonate, filtered, and again washed with much water. A wash with dilute hydrochloric acid served to get rid of any residual pyridine, and the product was finally washed with more water. The crude, wet benzoate (118 grams) was dissolved with reflux in 1400 ml. methanol, charcoaled, filtered, and cooled. The colorless platelets were filtered, washed with cold methanol, and dried. The product weighed 41.5 grams (43 percent yield), M.P. 115 to 118°.

*Analysis.*—Calc'd for C, 36.01; H, 2.42; N, 12.60; Cl, 10.63. Found: C, 36.26; H, 2.55; N, 12.58; Cl, 10.28.

Example II.—Preparation of 2-chloro-2-nitro-n-butyl-3,5-dinitrobenzoate 2-chloro-2-nitrobutanol-1 (0.29 M) is dissolved in pyridine (250 ml.). To the solution is added (0.32 M) 3,5-dinitrobenzoyl chloride. The mixture is left standing for 10 minutes, slowly heated to reflux, and refluxed for 30 minutes. The mixture is poured on ice and water, and the crystals filtered. The crude product is washed well with water, slurried for 10 minutes with one liter of 2 percent sodium carbonate, filtered, and again washed with much water. A wash with dilute hydrochloric acid served to get rid of any residual pyridine, and the product is finally washed with more water. The crude, wet benzoate is dissolved with reflux in 1400 ml. methanol, charcoaled, filtered, and cooled. A good yield of 2-chloro-2-nitro-n-butyl-3,5-dinitrobenzoate is thus obtained.

Example III.—Preparation of 2-chloro-2-nitro-n-propyl p-nitrobenzoate 2-chloro-2-nitropropanol-1 (2.6 grams, 0.0185 M) was dissolved in pyridine (15 ml.). To this deep yellow solution was added 3.7 grams (0.02 M) p-nitrobenzoyl chloride. The reaction mixture warmed slightly and became colorless. After refluxing for 10 minutes, the now light brown solution was filtered from dirt and poured into ice and water. The colorless precipitate was filtered and washed alternatively with water, dilute sodium carbonate, water, dilute hydrochloric acid, and water. The yield of crude ester was 1.2 grams (23 percent). A small sample recrystallized from isopropanol melted at 67 to 69° C.

Example IV.—Preparation of 2-chloro-2-nitro-n-pentyl p-nitrobenzoate 2-chloro-2-nitropentanol-1 (0.0185 M) is dissolved in pyridine (15 ml.). To this solution is added (0.02 M) p-nitrobenzoyl chloride. The reaction mixture warmed slightly. After refluxing for 10 minutes, the solution is filtered and poured into ice and water. The precipitate is filtered and washed alternately with water, dilute sodium carbonate, water, dilute hydrochloric acid, and water. By gas chromatography, the product is found to be 2-chloro-2-nitro-n-pentyl-p-nitrobenzoate.

Examples V and VI illustrate Reaction III.

Example V.—Preparation of bis(2-chloro-2-nitro-n-propyl)-4,4-dinitro-1,7-heptanedioate 2-chloro-2-nitro-propanol-1 (21.5 grams, 0.154 M) and 4,4-dinitro-1,7-heptanedioyl chloride (20.0 grams, 0.07 M) were heated together on a steam-bath for 2¾ hours. There was a gradual evolution of hydrogen chloride. The melt was clear until, shortly before the end of the heating period, crystallization began. The reaction mixture was cooled, diluted first with 50 ml. of isopropanol, and then with much water. The crude product was filtered, triturated in a mortar with water, filtered, and washed well with water. The ester was stirred for 10 minutes with 200 ml. of 1 N sodium carbonate, filtered, and washed thoroughly with water. The wet filter-cake was recrystallized from 650 ml. methanol. The colorless product weighed 23.5 grams (68 percent) and melted at 117 to 123° C. Elemental analysis was as follows:

*Analysis.*—Calc'd for C, 31.68; H, 3.68; N, 11.38; Cl, 14.39. Found: C, 31.83; H, 3.84; N, 11.23; Cl, 14.35.

Example VI.—Preparation of bis(2-chloro-2-nitro-n-propyl)-4,4,6,6,8,8-hexanitro-1,11-undecanedioate 2-chloro-2-nitro-propanol-1 (0.154 M) and 4,4,6,6,8,8-hexanitro-1,11-undecanedioic acid (0.07 M) (prepared according to United States Patent No. 3,000,932) are heated together on a steambath for about 3 hours. There is a gradual evolution of water. The reaction mixture is cooled, diluted first with isopropanol and then with water. The crude product is filtered, and washed well with water. The ester is stirred for 10 minutes with 200 ml. of sodium carbonate, filtered, and washed with water. The wet filter-cake is recrystallized from methanol. The product represents a good yield of bis(2-chloro-2-nitro-n-propyl)-4,4,6,6,8,8-hexanitro-1,11-undecanedioate.

When the foregoing example is repeated, using 2-chloro-2-nitro-pentanol-1 and 5,5,7,7,9,9 - hexanitro-1,13-tridecanedoic acid in lieu of 2-chloro-2-nitro-propanol-1 and 4,4,6,6,8,8-hexanitro-1,11-undecanedioic acid, respectively, bis(2 - chloro - 2-nitro-n-pentyl) 5,5,7,7,9,9-hexanitro-1,13-tridecanedioate is obtained in substantially pure form.

Reaction IV is illustrated by Examples VII and VIII.

Example VII.—Preparation of 2,6-dichloro-2,4,6-trinitroheptane

To a solution of 80 grams NaOH (2.0 M) in 2.0 liters of water at 7 to 11° C. was added with stirring, over 20 minutes, 274 grams (2.0 M) 1-chloro-1-nitroethane (assumed to be 80 percent pure). A heavy colorless oil (57 grams) was separated from the light yellow solution. To this solution was added a solution of 145 grams (1.0 M) 2-nitroallylacetate in 320 ml. methanol over one half hour. The temperature rose from 10° C. to 27° C. (with occasional cooling), the pH remained at 8. After stirring for an additional hour, during which time the temperature did not change, the pH was 5, and a light yellow oil had deposited on the bottom of the reaction vessel. The reaction mixture was then stirred at 35 to 46° C. for one hour, at 45 to 53° C. for another hour, and at 40 to 46° C. for 15 minutes. The pH remained at 5. After cooling to −3° C., the supernatant liquid was decanted from the tan viscous residue, and the latter washed twice with ice water by decantation. The semi-solid was taken up in 350 ml. of methylene chloride and dried over sodium sulfate. Evaporation of the solvent at 40 to 45° C. left 233 grams of viscous, light orange oil. The oil was refluxed with 1 liter of diisopropyl ether for one half hour; most of the oil did not dissolve. The mixture was kept at −20° overnight, and the crystals along the walls of the flask were filtered and washed. The crude, light yellow product weighed 3.5 grams. Repeated extraction of the residual oil gave an additional 5.2 grams (total: 8.7 grams, 2.8 percent). Five grams of the crude product was crystallized twice from isopropanol, using charcoal, to give 3.4 grams of colorless product, M.P. 73 to 119° C.

*Analysis.*—Calc'd for C, 27.65; H, 3.65; N, 13.82; Cl, 23.32. Found: C, 27.93; H, 3.80; N, 14.95; Cl, 12.01.

Example VIII.—Preparation of 3,7-dichloro-3,5,7-trinitrononane

To a solution of NaOH (2.0 M) in 2.0 liters of water at about 10° C. is added with stirring, 2.0 M of 1-chloro-1-nitropropane. To this solution is added a solution of (1.0 M) 2-nitroallylacetate in methanol. Stirring is continued for about 3 to 4 hours at from about 30 to 45° C. After cooling to about 0° C., any supernatant liquid is decanted and the residue washed with ice water. The residue is taken up in methylene chloride and dried over sodium sulfate. Evaporation of the solvent at 40 to 45° C. left 233 grams of viscous, light orange oil. The oil is refluxed with diisopropyl ether and then filtered and washed. The crude 3,7-dichloro-3,5,7-trinitrononane is crystallized from isopropanol.

Chlorination Reaction V is illustrated by Examples IX and X.

Example IX.—Preparation of 3,5,7-trichloro-3,5,7-trinitrononane

The crude 3,7-dichloro - 3,5,7 - trinitrononane (0.015 M) is dissolved with warming in methanol. Below about 10° C., around 6 ml. of 10 percent sodium hydroxide are added. Chlorine is passed through the suspension for about 10 minutes. The mixture is left for about an hour in an ice-bath, filtered, and the crude product washed first with cold methanol and then with water. The dry product is recrystallized once to yield substantially pure 3,5,7-trinitro-3,5,7-trinitrononane.

Example X.—Preparation of 2,4,6-trichloro-2,4,6-trinitroheptane

The crude 2,6 - dichloro - 2,4,6 - trinitroheptane (4.6 grams, 0.015 M) was dissolved with warming in 40 ml. of methanol. Below 10° C., 6 ml. of 10 percent sodium hydroxide were added to pH 8. A small quantity of crystals separated from the solution. Chlorine was passed through the suspension at 10° C. for about 10 minutes. The product separated almost immediately in the form of colorless crystals. The mixture was left for an hour in an ice-bath, filtered, and the crude product washed first with cold methanol and then with water. The dry product weighed 3.3 grams (65 percent) and melted at 117 to 131°. One crystallization from isopropanol yielded 2.0 grams of colorless platelets, M.P. 120 to 137°.

Analysis.—Calc'd for C, 24.94; H, 3.12; N, 12.23; Cl, 31.21. Found: C, 24.82; H, 2.98; N, 12.40; Cl, 31.40.

Reaction VI is illustrated by Examples XI and XII.

Example XI.—Preparation of 2,6-dichloro-2,6-dinitro-4-azaheptane

To a mixture of 110 grams of 2-chloro-2-nitropropanol-1 in 400 ml. of water was added a solution of 125 grams slightly wet ammonium acetate in 140 ml. of water. The mixture was heated with stirring. All the starting material had gone into solution after five minutes, and an oil began to separate after ten minutes. The mixture was stirred for three hours at 95° C. The oil (80 grams) was separated and washed twice with water. After drying in methylene chloride over sodium sulfate, 72 grams of product was obtained (70 percent yield). A small portion of this oil was crystallized from isopropanol, M.P. 37 to 39° C.

Analysis.—Calc'd for C, 27.71; H, 4.24; N, 16.17; Cl, 27.25. Found: C, 28.29; H, 4.27; N, 15.81; Cl, 27.56.

When the foregoing example is repeated using, first ammonium nitrite, and then ammonium α-naphthoate, in lieu of ammonium acetate, the desired 2,6-dichloro-2,6-dinitro-4-azaheptane is again obtained.

Example XII.—Preparation of 3,7-dichloro-3,7-dinitro-5-azanonane

To a mixture of about 125 grams of 2-chloro-2-nitro-butanol-1 in about 400 ml. of water is added a solution of about 150 grams slightly wet ammonium benzoate in about 150 ml. of water. The mixture is heated with stirring. The mixture is stirred for about three hours at about 95° C. The product is separated and washed twice with water. After drying, the product is found by gas chromatography to be 3,7-dichloro - 3,7 - dinitro-5-aza-nonane.

The nitration Reaction VII is more particularly described in Examples XIII through XV.

Example XIII.—Preparation of 2,6-dichloro-2,4,6-trinitro-4-azaheptane

To 8.5 ml. of 70 percent nitric acid (0.133 M) was added dropwise, at 0° C., with stirring, 31.4 grams (0.121 M) of 2,6-dichloro-2,6-trinitro-4-azaheptane. After about one-third of the amine had been added, the crystalline mixture became too thick to stir. An additional 8.5 ml. of nitric acid was added. When stirring again became ineffective, 40 ml. of ether was added and the addition of nitric acid completed. The total addition time was about 45 minutes. After stirring five minutes longer, the salt was filtered and washed with ether. The dry product weighed 28.5 grams (73 percent) and melted at 115 to 148° with decomposition. To a mixture of 15 ml. acetic anhydride, 0.25 ml. concentrated hydrochloric acid, and 0.75 ml. of 99 percent nitric acid at 20 to 25° C. was added, in portions over 30 minutes, 10 grams (0.031 M) of the nitric acid salt. The temperature tended to rise slightly on addition of the solid, which did not seem to dissolve. After about one-half of the salt had been added, an additional 15 ml. of acetic anhydride was added to facilitate the stirring. When addition of the salt was completed, stirring was continued without external cooling. The temperature gradually rose to 32° (after 45 minutes), at which point nearly all of the salt was in solution. The temperature then fell, and large crystals separated from the solution. Stirring was continued for another half hour. The reaction mixture was poured on ice and the produce isolated by filtration and washing with water. The crude nitramine weighed 8.5 grams (90 percent) and melted at 90 to 110°. A small sample was recrystallized twice from isopropanol and then melted at 123 to 129°.

Analysis.—Calc'd for C, 23.60; H, 3.31; N, 18.42; Cl, 23.25. Found: C, 23.93; H, 3.51; N, 18.90; Cl, 24.13.

Example XIV.—Preparation of 3,7-dichloro-3,5,7-trinitro-5-azanonane

To 70 percent nitric acid (0.133 M) is added dropwise, at 0° C., with stirring, (0.121 M) of 3,7-dichloro-3,7-trinitro-5-azanonane. After about one-third of the amine had been added, an additional 8.5 ml. of nitric acid and about 50 ml. of ether are added. The nitric acid salt is filtered and washed with ether. To a mixture of 15 ml. acetic anhydride, 0.25 ml. concentrated hydrochloric acid, and 0.75 ml. of 99 percent nitric acid at 20 to 25° C., is added 0.031 M of the nitric acid salt. After about one-half of the salt had been added, an additional 15 ml. of acetic anhydride is added. When addition of salt is completed, stirring is continued for about 1½ hours. The reaction mixture is poured on ice and the 3,7-dichloro-3,5,7-trinitro-5-azanonane isolated by filtration and washing with water.

Example XV.—Preparation of 2,6-dichloro-2,4,6-trinitro-4-azaheptane

A solution of 72 grams (0.28 M) of 2,6-dichloro-2,6-dinitro-4-azaheptane in 600 ml. of acetic anhydride was added dropwise, with stirring, to 600 ml. of 99 percent nitric acid at —10 to +6° C. After all of the amine had been added (1¼ hours), the reaction mixture was stirred an additional hour at 0°. It was poured into 7 to 8 liters of ice and water. The nitramine separated as nearly colorless crystals. The suspension was then stirred for half an hour and the product filtered and washed well with water. After drying, 76 grams (90 percent) of crude nitramine, M.P. 90 to 105° C., was obtained. The crude product from this and other preparations (98.5 grams) was recrystallized first from 1100 ml., and then from 850 ml. isopropanol. Each time, the crystallization mixture was cooled only to room temperature. The purified product (39 grams, 40 percent recovery) melted at 123 to 130° C. Upon concentrating the combined filtrates, an additional 33 grams (total: 72 grams, 73 percent recovery) of nitramine was recovered.

Analysis.—Calc'd for C, 23.60; H, 3.31; N, 18.42; Cl, 23.25. Found: C, 24.53; H, 3.47; N, 18.52; Cl, 23.58.

The novel compounds of this invention containing one or more terminal

groups may be isolated and purified in conventional manner by procedures known to those skilled in the art. As is apparent from the foregoing examples, the specific procedure to be followed in any given case is dependent to some extent on the particular product involved. In addition, the degree of purity of product desired will, in some cases, vary the techniques employed. In general, isolation and purification of the compounds of our invention are readily accomplished by crystallization, evaporation, esterification and/or washing.

The compounds of this invention possess many valuable uses. These compounds are particularly useful as oxidizers. These compounds are also used in batteries and cells as depolarizers. In this connection the compounds of this invention function to prevent hydrogen accumulation at the electrodes.

Since the compounds of this invention contain a plurality of nitro groups, these compounds are also inherently useful as explosives, and may be used for this purpose either alone or in admixture with other known explosive ingredients.

We claim:

1. Compounds having the general formula:

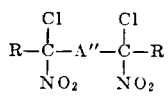

wherein R is lower alkyl, and A'' is selected from the group consisting of

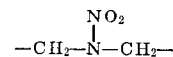

radical and a

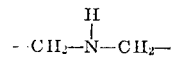

radical.

2. The compound 2,6 - dichloro - 2,4,6 - trinitro - 4-azaheptane.

3. The compound 2,6 - dichloro - 2,6 - dinitro - 4-azaheptane.

References Cited

UNITED STATES PATENTS 2,686,804  8/1954  Cason.
2,880,232  3/1959  Frankel et al.
3,000,949  9/1961  Frankel et al.

CHARLES B. PARKER, *Primary Examiner.*

R. L. RAYMOND, *Assistant Examiner.*

U.S. Cl. X.R.

149—109; 260—471, 485, 644